(12) United States Patent
Chassoulier et al.

(10) Patent No.: US 6,384,500 B1
(45) Date of Patent: May 7, 2002

(54) MAGNETIC CENTERING BEARING WITH HIGH-AMPLITUDE TILT CONTROL

(75) Inventors: Damien Chassoulier, Mouans-Sartoux; Christian Chillet, Seyssinet-Pariset; Jérôme Delamare, Grenoble; Jean-Paul Yonnet, Meylan, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/599,855

(22) Filed: Jun. 23, 2000

(30) Foreign Application Priority Data

Aug. 9, 1999 (FR) ............................................. 99 10314

(51) Int. Cl.[7] .......................... H02K 7/09; H02K 49/00
(52) U.S. Cl. ...................................... 310/90.5; 310/103
(58) Field of Search ........................ 310/90.5, 162–166, 310/254, 266, 261, 46, 152, 82; 29/596–598; 318/100, 135, 701; 417/422.12, 423.14

(56) References Cited

U.S. PATENT DOCUMENTS

| | | | | |
|---|---|---|---|---|
| 4,785,212 A | | 11/1988 | Downer et al. ............. 310/90.5 |
| 4,611,863 A | * | 9/1989 | Isely .......................... 310/90.5 |
| 4,874,998 A | * | 10/1989 | Hollis, Jr. ............... 318/568.21 |
| 5,105,669 A | * | 4/1992 | Gruber ........................ 74/5.46 |
| 5,142,932 A | * | 9/1992 | Moya et al. ............. 74/490.05 |
| 5,708,312 A | * | 1/1998 | Rosen et al. ................... 310/90 |
| 5,892,310 A | * | 4/1999 | Kempas ....................... 310/152 |

FOREIGN PATENT DOCUMENTS

| | | |
|---|---|---|
| EP | 0 294 760 A1 | 12/1988 |
| EP | 0 338 933 A1 | 10/1989 |
| EP | 0 338933 A1 * | 10/1989 |
| FR | 2 535 479 A1 | 5/1984 |
| FR | 2 695 968 A1 | 3/1994 |

\* cited by examiner

*Primary Examiner*—Tran Nguyen
(74) *Attorney, Agent, or Firm*—Sughrue Mion, PLLC (57) ABSTRACT

A magnetic bearing for centering and controlling tilting of a first body relative to a second body includes centering members adapted to center the first body magnetically relative to the second body at least in the direction transverse to the reference axis, two permanently magnetized rings carried by a first ferromagnetic armature fastened to the first body, an annular plurality of (at least three) tilt windings fastened to the second body and each including two groups of circumferential strands respectively adapted to face each of the permanently magnetized rings regardless of the orientation of the hollow outer part, and an excitation circuit adapted to apply excitation currents to the tilt windings adapted to generate tilting forces in the air-gaps.

32 Claims, 7 Drawing Sheets

MAGNETIC CENTERING BEARING WITH HIGH-AMPLITUDE TILT CONTROL

The invention relates to a magnetic bearing for magnetically centering a moving body relative to a fixed body with respect to at least one axis and further including means for controlling tilting over a range of relative angular movement of at least plus or minus 5° and up to plus or minus 15° or more.

BACKGROUND OF THE INVENTION

Magnetic centering of one body relative to another body with respect to a given axis can be passive or active, depending on whether the centering magnetic fluxes are generated passively by permanently magnetized means or at least in part actively by an appropriate choice of the amplitude of an excitation current applied to windings. This is known in the art.

For physical reasons, a body cannot be centered passively relative to another body with respect to three non-coplanar axes.

For a given level of centering performance, the use of permanent magnets has the advantage of minimizing the electrical energy required for centering, compared to a configuration with no magnets.

In practice, the body which is to be centered relative to a fixed body can have various degrees of freedom relative to the fixed body. For example, the moving body may be a rotor which rotates continuously or non-continuously about a rotation axis which is often coincident with one of the three centering axes. A configuration like this is of great practical importance, especially in the space field, in momentum wheels or in reaction wheels.

However, to complement such rotation, it may be necessary to control tilting about one or more axes transverse to the rotation axis. Thus in the field of satellites it is beneficial to be able to incline the rotation axis of a momentum or reaction wheel, for example to contribute to satellite attitude control.

Magnetic bearings with the facility for tilting have already been proposed. The document WO89/12178 may be cited in particular.

However, as a general rule, magnetic bearings in connection with which the facility for tilting has been mentioned are often bulky and, most importantly, rapidly lose their centering capability when the tilt exceeds angles of the order of one degree. In the case of the previously mentioned document WO89/12178, for example, tilting about axes transverse to the rotation axis is mentioned only as a form of interference that has to be compensated. Also, the globally flat configuration of the various components of the system described (which is very flat in the direction parallel to the rotation axis) does not allow a high amplitude of tilting (not more than approximately 1°).

This is because controlling tilting within a large range of movement appears to be difficult a priori since, to be able to generate high torques electromagnetically, it appears to be necessary to provide large windings (to obtain high localized forces) around a reference axis passing through the center of tilting and to locate them at a large distance from the center of tilting (so that the forces provide high torques). These two constraints make it mandatory to locate the components conjointly assuring tilt control on a large-diameter circle; if tilting is then to be controlled within a large range of angular movement, the components assuring such movement must extend a great distance in the direction parallel to the reference axis, but the problem then arises that tilting moves and inclines some of the surfaces defining the air-gaps crossed by the fluxes generated by said windings, which reduces the thickness of some of the air-gaps; if this thickness is not to be reduced to zero, the air-gaps must have a large nominal width, which means that, for a given flux in them, the size of the windings and the power applied to them must be increased. In the foregoing, it is also necessary to prevent any contact between the surfaces defining all the other air-gaps of the bearing, in particular those which center the moving body in the direction parallel to or transverse to the reference axis.

OBJECTS AND SUMMARY OF THE INVENTION

The object of the invention is to provide a magnetic bearing (sometimes referred to as a magnetic suspension) for centering and controlling tilting of a first body, which is mobile in tilting about a tilting center, relative to a second body, which system allows relative tilting through at least 5°, which tilting is significantly greater than that allowed by prior art magnetic bearings and can in particular reach or even exceed tilting angles of plus or minus 15°, providing good performance in centering in directions parallel to and transverse to a reference axis but having only a low power consumption.

A subsidiary object of the invention is a bearing of the aforementioned type which is compact within an annular volume surrounding a central free space to facilitate installation of equipment at the center of the bearing.

To this end the invention proposes a magnetic bearing for centering and controlling tilting of a first body, which is mobile in tilting within a range of angular movement of at least plus or minus 5° about a center of tilting, relative to a second body having a reference axis passing through the center of tilting, the bearing including centering members adapted to center the first body magnetically relative to the second body at least in the direction transverse to the reference axis and:

two permanently magnetized rings carried by a first ferromagnetic armature fastened to the first body, extending around the reference axis and each having a magnetization direction which passes at all points at least approximately through the reference axis, which rings are parallel to each other and offset in the direction parallel to the reference axis and on respective opposite sides of the center of tilting and have free edges substantially forming portions of a common sphere centered on the center of tilting, an annular plurality of (at least three) tilt windings fastened to the second body and each including two groups of circumferential strands respectively adapted to face each of the permanently magnetized rings regardless of the orientation of the hollow outer part relative to the center of tilting within the range of movement in tilting, which windings are carried by a second ferromagnetic armature defining in conjunction with the magnetized rings air-gaps whose thickness remains constant throughout the range of angular movement in tilting, and an excitation circuit adapted to apply excitation currents to the tilt windings adapted to generate tilt forces in the air-gaps.

The fact that the surfaces defining the air-gaps for generating tilting forces have a non-zero inclination to the reference axis means that the thickness of these air-gaps can be constant, achieving constant performance in terms of tilt control, with low electrical power consumption (all that is required to choose a small value for the constant thickness).

A posterior reasoning might suggest that giving these air-gaps a non-zero inclination is obvious, but as far as the inventors are aware this has never been proposed, no doubt because of certain prejudices in the art, including the idea that inclining the surfaces defining the air-gaps is a priori incompatible with a range of movement in the direction parallel to the reference axis (within which range of movement axial centering must be achieved) and/or the idea that it is doubtless very difficult in practice to provide inclined surfaces of this kind and thereafter to locate, without contact, the various fixed and mobile components of the bearing so that all of the air-gaps contributing both to centering and to tilting really have the required geometries and dimensions. Finally, there has no doubt been the idea that providing tilt control over a wide range of movement was incompatible with magnetic centering, given that prior art magnetic centering devices are not able to provide centering in three directions (for example the direction of the reference axis and two transverse axes) unless the moving body retains approximately the same orientation relative to the fixed body (or more generally relative to which the moving body must be centered). It has nevertheless become apparent that to enable large tilting, up to plus or minus 10° or more, or even plus or minus 15°, relative to a transverse plane intersecting the reference axis at the center of tilting, whilst retaining constant air-gaps, the required inclination of the edges defining the air-gaps remains moderate and does not in any way impede axial centering or raise any real problems of manufacture or assembly.

This remains true, even if the radial centering components are disposed inside the permanently magnetized rings and the annular plurality of windings.

In fact, the tilt windings are advantageously excited by the excitation circuit so as to generate not only tilting forces (for example by excitation of two windings to generate two forces in opposite directions) but also centering forces in the direction parallel to the reference axis (for example by exciting two windings to generate two forces in the same direction).

Also, the local direction of magnetization of the rings preferably passes through the center of tilting, which advantageously maximizes the flux lines across that air-gap.

The two permanently magnetized rings are preferably of the same diameter and symmetrical to each other about the center of tilting and the tilt windings are preferably symmetrical about the transverse plane. This facilitates the manufacture of the tilt control means (the two rings can be identical). In practice, this symmetrical positioning of the tilt control means is reflected in a symmetrical range of angular tilting movement relative to the transverse plane passing through the center of tilting.

The distance between the two rings in a plane containing the reference axis preferably corresponds to an angular offset of at least 10° relative to the center of tilting, and more preferably an angular offset of at least 20°. In the aforementioned example where the rings are symmetrical with respect to the transverse plane, this configuration amounts having the two rings define an angular offset of at least ±5° and preferably at least ±10° relative to the transverse plane passing through the center of tilting.

To maximize the efficiency of the tilt control means, the circumferential strands of each group of windings are disposed adjacently, in a flat layer, on a spherical surface of the second armature, centered on the center of tilting. This side-by-side disposition of the circumferential strands of each group, in layers, advantageously minimizes the thickness of the air-gaps in which these strands are located.

It has been stated that the circumferential strands of the tilt windings continue to face the magnetized rings throughout the movement in tilting. To this end, the rings can have an angular amplitude in a plane passing through the reference axis which is less than that of each group of circumferential strands of each winding. In this way, in any tilting configuration, the whole of the free edge of the magnetized rings faces the circumferential strands. However, in a different embodiment], the rings have an angular amplitude in this plane passing through the reference axis which is greater than that of each group of circumferential strands of each winding, in which case the circumferential strands of each group remain at all times within one of the air-gaps defined by one of the annular rings.

The second armature (the one carrying the tilt windings) is preferably radially inside the first armature (the one carrying the magnetized rings).

In a first configuration, the centering members can in part consist of members of the tilting means (the magnetized rings). In this case, the centering members includes two parallel annular pluralities of (at least three) centering windings fastened to the second ferromagnetic armature, each winding surrounds a respective portion of the second ferromagnetic architecture, these respective portions are divided into two parallel pluralities of ferromagnetic portions respectively adapted to face each of the permanently magnetized rings regardless of the orientation of the hollow outer part relative to the center of tilting within the range of relative angular movement in tilting, and the excitation circuit is designed to apply to the centering coil excitation currents adapted to generate forces for radially centering the moving body.

Clearly, having the centering windings and the tilt windings co-operate with the same magnetic rings achieves great compactness within an annular volume. Providing the various windings on the same armature does not give rise to any significant problem of coupling between the various magnetic circuits consisting of the rings and each type of winding.

The circumferential strands of the tilt winding advantageously extend along the ferromagnetic portions around which the centering windings are wound, which avoids having to locate the various windings at axial distances from each other and contributes to a compact assembly.

The numbers of centering windings and tilt windings are advantageously the same, which simplifies their electrical control. These windings also preferably have the same angular amplitude about the reference axis, which helps to facilitate manufacture. The various windings preferably face each other in the axial direction, which avoids the need to interfere with the surface of the second armature, which in practice is spherical, at too many points.

Of course, the number of windings in each plurality is preferably equal to four, divided into two pairs of radially opposed windings offset 90° about the reference axis.

The second armature (the one carrying the tilt windings) is preferably radially inside the first armature (the one carrying the magnetized rings).

In another configuration, the centering members are independent of the aforementioned tilt windings and rings.

The centering members preferably include:
  a hollow outer part made at least in part from a ferromagnetic material and fastened to the first body and having an inside surface whose shape is a portion of a sphere whose center is substantially coincident with the center of tilting and which extends around the reference axis on respective opposite sides of a transverse plane which is perpendicular to the reference axis and passes through the center of tilting, and an inner part fastened to the second body, including a plurality of (at least three) ferromagnetic areas which are offset angularly about the reference axis, each of which areas defines in conjunction with the inside surface of the hollow outer part two centering air-gaps provided with a specific winding adapted to generate magnetic flux lines closing across the two air-gaps, which windings form part of a set of windings connected to the excitation circuit adapted to generate magnetic fluxes in the centering air-gaps adapted to center the hollow outer part relative to the inner part at least in the direction transverse to the reference axis.

The centering members can have a very simple structure in which each ferromagnetic area is a simple electromagnet (U-shaped ferromagnetic part having two edges facing the inside surface of the hollow outside part to form two air-gaps and a winding for generating variable flux lines in those air-gaps).

Nevertheless, this inner part advantageously includes two separate members which are disposed on respective opposite sides of the transverse plane and each of which includes a plurality of (at least three) ferromagnetic areas offset angularly about the reference axis, each area defines in conjunction with the inside surface of the hollow outer part two air-gaps provided with a specific winding adapted to generate magnetic flux lines closing across the two air-gaps, each member including a group of windings includes at least the specific windings of the ferromagnetic areas, the members are separated in the direction parallel to the reference axis by a space having a reluctance adapted to prevent flux lines generated by the group of windings of one of the members crossing this space and the windings of each group are connected to the excitation circuit.

Clearly, the centering members therefore advantageously include a very compact inner part on which a few windings are mounted, possibly with a permanent magnet inside the space between the two separate members (see below). The overall size and weight are therefore low. Around this inner part is a hollow outer part whose inside surface is the shape of a hollow sphere (which is why the magnetic bearing of the invention can usefully be referred as a ball joint bearing), so that the air-gaps defined therewith, at a distance from the aforementioned transverse plane, are inclined relative to the reference axis and can contribute to the generation of centering forces parallel to the reference axis.

As just indicated, the space between the two separate members of the inner part can be occupied by a magnet which is permanently magnetized in a direction parallel to the reference axis. The magnet therefore generates magnetic flux lines continuously without consuming electrical energy. On the other hand, no flux lines generated by an electrical current in any of the windings pass through the magnet.

However, another situation of practical importance is that in which this space is a free space forming a large fixed air-gap, i.e. one which does not contain any solid material, with the possible exception of a non-ferromagnetic connecting member for fastening the two members together. This space is filled with vacuum or with air, depending on the environment in which the magnetic bearing is located.

In conjunction with the air-gaps and a ferromagnetic portion of the hollow outer part and the associated specific winding, each ferromagnetic area defines a magnetic actuator. The various magnetic actuators can be independent of each other. However, for ease of manufacture and efficiency, it is beneficial for the ferromagnetic areas of each member to be part of the same ferromagnetic component.

It is also clear that the centering members are easier and less costly to manufacture if the two separate members have the same geometry. Furthermore, controlling the specific windings of the magnetic bearing is easier if the areas of each member are disposed symmetrically with respect to the transverse plane crossing the space between the separate members.

With the same aim of simplicity, the number of ferromagnetic areas of each member is advantageously an even number and each ferromagnetic area is preferably disposed opposite another ferromagnetic area with respect to the reference axis. In one particularly simple arrangement each member has four ferromagnetic areas divided into two pairs of areas which are diametrally opposed with respect to the reference axis and offset by 90° about the reference axis.

Each ferromagnetic area of each member preferably includes first and second projections directed towards the inside surface of the hollow outer part to form the air-gaps of that area with the first of these projections surrounded by said specific winding. The second projections of these ferromagnetic areas are advantageously part of the same annular projection, which contributes to facilitating manufacture of the member. The annular projection is advantageously opposite the first projections relative to the transverse plane crossing the space between the members. Because the inner part is globally ball-shaped, the specific windings can be located in an area of greater diameter, which optimizes the size of the windings that can be mounted in the centering members.

An additional winding is advantageously wound around each member between the first and second projections of the ferromagnetic areas, making it particularly simple to generate flux lines distributed all around the reference axis, whether in conjunction with the aforementioned specific windings or not.

Of course, these additional windings are connected to the excitation circuit, which is designed to apply excitation currents selectively to the additional windings. In fact, the magnetic fluxes that such additional windings generate contribute to centering the hollow outer part in the direction parallel to the reference axis. This is because the specific windings of each of the ferromagnetic areas can also be electrically energized to provide all or part of the centering in the direction parallel to the reference axis.

Thus not only the tilt windings but also the specific windings and the additional windings can be excited at will to provide all or part of the axial centering (centering in the direction parallel to the reference axis).

The hollow outer part can have a large annular amplitude, for example of plus or minus 50° relative to the transverse plane perpendicular to the reference axis. The hollow outer part can even have only one opening in it, for attaching the members facing an external frame, with the hollow outer part intersecting the reference axis on the opposite side of this single opening.

Within the same member, the windings of each of the ferromagnetic areas are advantageously adjacent in the circumferential direction to maximize the surface area of the edge of the projections around which the windings are wound. This maximizes centering performance. The additional winding, if present, is also advantageously adjacent the specific windings of each ferromagnetic area in the direction parallel to the reference axis, which guarantees optimum use of the space inside the hollow outer part.

BRIEF DESCRIPTION OF THE DRAWINGS

Objects, features and advantages of the invention will emerge on reading the following description, which is given by way of non-limiting example and with reference to the accompanying drawings, in which.

MORE DETAILED DESCRIPTION

Figure 1:
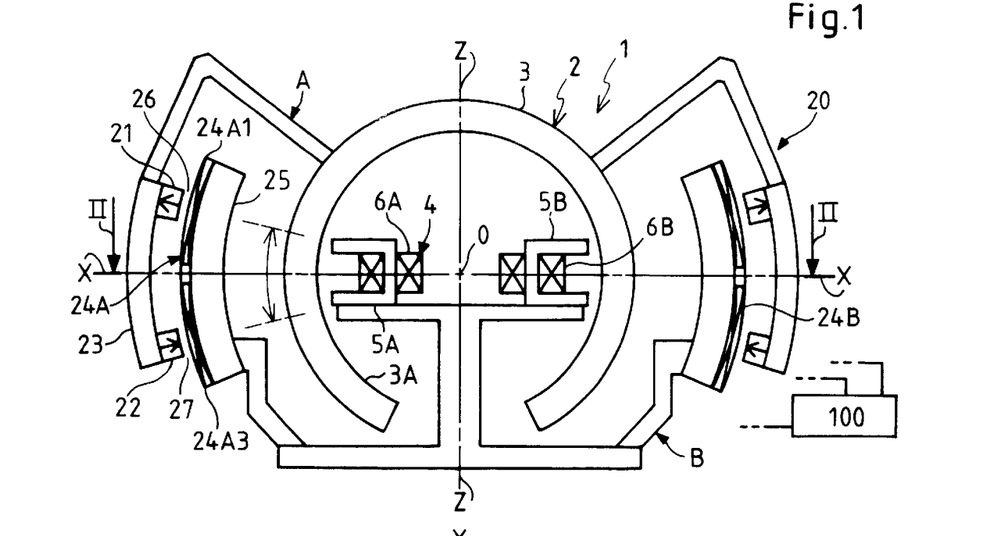
FIG. 1 is a view of a magnetic bearing according to the invention in axial section taken along the line I—I in FIG. 2 in a plane containing a reference axis Z—Z.

FIG. 1 shows a magnetic bearing 1 for centering and controlling tilting of a first body A, which is mobile in tilting within a range of at least 5° about a center O of tilting, relative to a second body B having a vertical reference axis Z—Z passing through the center of tilting.

The bearing 1 includes:
centering members 2 adapted to center the first body A relative to the second body B magnetically, and
tilt control members 20.

In this embodiment the centering members 2 are radially inside the tilt control members and essentially include a hollow outer part 3 and an inner part 4.

Figure 2:
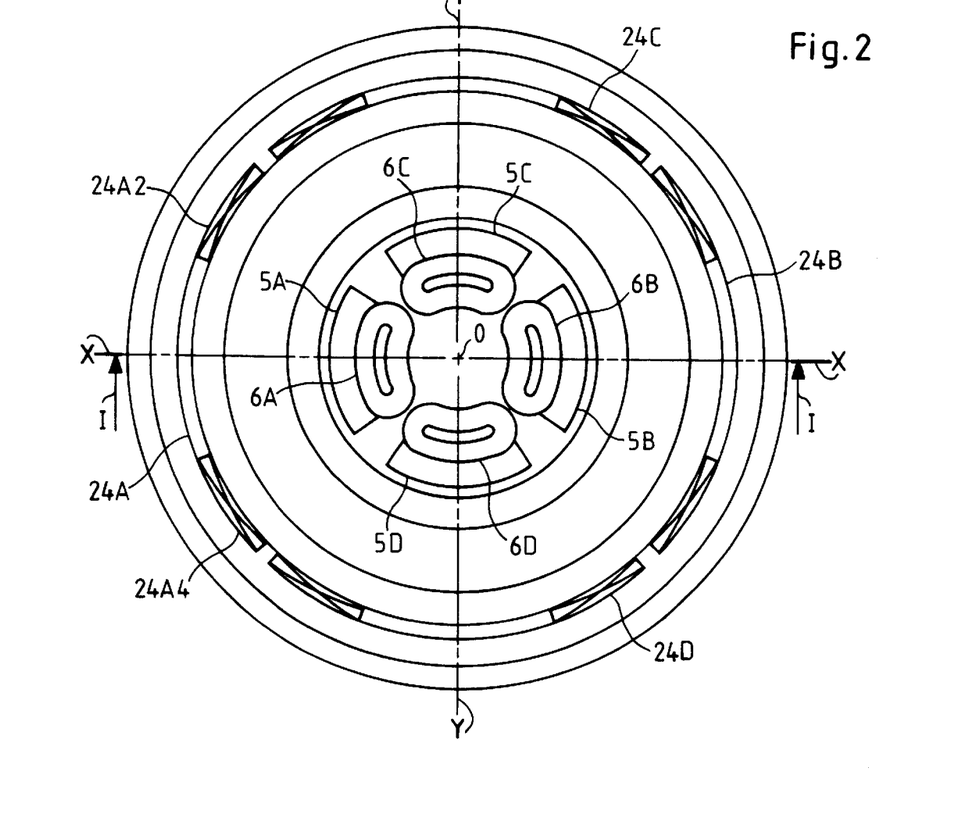
FIG. 2 is a view of the bearing in cross-section taken along the line I—I in FIG. 1.

The hollow outer part 3 is fastened to the first body and has an inside surface 3A whose shape is a portion of a sphere whose center is substantially coincident with the center of tilting and which extends around the reference axis on both sides of a transverse plane perpendicular to the reference axis, whose position X—X is shown in FIG. 1 and which further contains another transverse axis Y—Y (see FIG. 2). This transverse plane is perpendicular to the reference axis passing through the center of tilting. The hollow outer part is at least partly made from a ferromagnetic material.

The inner part 4 is fastened to the second body B and includes a plurality of (at least three) generally U-shaped ferromagnetic areas 5A, 5B, 5C and 5D offset angularly around the reference axis. Each area defines in conjunction with the inside surface of the hollow outer part two centering air-gaps and is provided with a specific winding 6A, 6B, 6C and 6D adapted to generate magnetic flux lines closing across the two air-gaps. These windings are connected to an excitation circuit 100 adapted to generate magnetic fluxes in the centering air-gaps for centering the hollow outer part relative to the inner part in the direction transverse to the reference axis.

In effect, each ferromagnetic area is an electromagnet whose winding generates magnetic flux lines which are closed in the hollow outer part, crossing the air-gaps therein, when an electrical current is applied by the circuit 100. The flux lines in an air-gap produce a force tending to minimize the thickness of the air-gap and whose amplitude is in direct proportion to the magnetic flux in the air-gap. Consequently, it is clear that all that is required is to apply current to the winding 6A of the left-hand electromagnet (5A) to generate a force tending to reduce the left-hand air-gaps and therefore to move the hollow outer part towards the right, for example.

Because the inside surface 3A of the part 3 is a portion of a sphere which is normally centered at O, it is clear that the foregoing remarks remain valid if the outer part tilts about O, even up to large angles of tilting, which in FIG. 1 can be as high as approximately 15° to either side of the transverse plane (X—X, Y—Y).

The tilt control means include, externally of the hollow outer part 3:
two permanently magnetized rings 21 and 22 carried by a first ferromagnetic armature 23 fastened to the hollow outer part; and
an annular plurality of tilt windings 24A, 24B, 24C, 24D (FIG. 2) carried by a second ferromagnetic armature 25 fastened to the inner part fastened to the body B.

The first ferromagnetic armature 23 and each of the two permanently magnetized rings 21 and 22 extend completely around the reference axis.

Each of the rings 21 and 22 is magnetized in a direction which is at least approximately radial. In other words, in a direction which passes at all points at least approximately through the reference axis. As seen in FIG. 1, this direction preferably passes at all points substantially through the center of tilting.

The permanently magnetized rings are magnetized in opposite directions. In other words, as seen in FIG. 1, one of the rings, here the upper ring 21, is magnetized in the outward direction and the other ring, here the lower ring 22, is magnetized in the direction towards the reference axis.

Each of the two rings has a free edge and the two free edges of the two rings are both directed either towards the reference axis (FIG. 1) or away from it. The two free edges are two portions of a common sphere concentric with the center O of tilting of the bearing.

The two rings are disposed in substantially parallel planes offset in the direction parallel to the reference axis on respective opposite sides of, and substantially symmetrical about, the center of tilting.

In a different embodiment, not shown, the combination of the first armature 23 and the two rings 21 and 22 is replaced by an assembly of two annular ferromagnetic parts having free edges of the previously mentioned type joined together by one or more rings permanently magnetized in the direction parallel to the reference axis, for example. This produces the same flow of flux lines.

Each of the tilt windings includes two groups of circumferential strands respectively adapted to face each of the free edges, namely, in this example, to face each of the rings 21 and 22. To be more precise, referring to the winding 24A, FIG. 1 shows two groups of circumferential strands 24A1 and 24A3 which are joined to form a loop by two groups of axial strands 24A2 and 24A4 (see FIG. 2).

In conjunction with the aforementioned free edges, the second ferromagnetic armature 25 defines air-gaps 26 and 27 whose thickness in the radial direction is constant throughout the range of angular movement in tilting of the hollow outer part relative to the inner part, i.e. within a range of angular movement which in practice is not less than 5°.

The magnetic circuit portion formed by the first ferromagnetic armature 23 and the two permanently magnetized rings 21 and 22 is symmetrical about the center of tilting and about the transverse plane.

In a plane containing the reference axis, for example the plane of FIG. 1, the free edges of the two rings are spaced by a distance corresponding to an angular offset of at least 10° relative to the center of tilting. In other words, the angle between two lines in FIG. 1 passing through the center O of tilting and the middle of the air-gaps 26 and 27, as seen in the left-hand part of FIG. 1, is at least 10° (of the order of 30°).

These circumferential strands of each group of windings, for example the strands of the groups 24A1 and 24A3, are disposed adjacently (i.e. in a very flat layer) on a spherical surface of the second armature 25 which is concentric with the center of tilting. The tilt windings are therefore very flat.

In this example, the rings have an angular amplitude in the plane passing through the reference axis, for example the plane of FIG. 1, less than that of each group of circumferential strands of each winding. This is because the angle at which the free edge of each ring is seen in FIG. 1 is of the order of one-quarter the angle at which the group of circumferential strands 24A1 or 24A3 is seen from the center of tilting in FIG. 1.

Consequently, there is a substantially constant number of circumferential strands in the air-gap defined between the second armature and the free edge of the magnets, regardless of the angular position in tilting of the hollow outer part, and therefore regardless of the position of the first armature relative to the center of tilting.

The magnetic flux crossing the air-gaps 26 and 27 is maximized when the direction of permanent magnetization of the rings converges towards the center of tilting, i.e. when that direction is perpendicular to those air-gaps. It is nevertheless clear that the loss of performance will be modest if the rings have directions of magnetization perpendicular to the reference axis in order to simplify manufacture.

When a current flows in one of the windings, for example the winding 24A, a force is generated between the two armatures 23 and 25 which is defined by the vector product of the magnetic fields in the air-gaps and the overall current flowing in the air-gaps.

Because the strands which are essentially in the magnetic field of the rings are elongate in the direction parallel to the air-gaps and in the direction parallel to the rings and the direction of the current and the flux change conjointly for each group of strands (see FIGS. 3 and 4), there is clearly a non-zero vertical resultant force in the direction parallel to the reference axis Z—Z. A tilting torque about the center of tilting can clearly be obtained by causing currents to flow in two tilt windings on respective opposite sides of the reference axis (see FIG. 3).

On the other hand, if opposite currents flow in these two tilt windings, forces which are symmetrical about the reference axis can be obtained, i.e. forces whose resultant is a force in the direction parallel to the reference axis (FIG. 4); if the tilt windings can be excited independently of each other, appropriate control of them therefore assures centering in the axial direction.

In the example shown, the second armature 25 is radially between the hollow outer part 3 and the first armature 23. It is nevertheless clear that the second armature can instead be radially outside the first armature 23. The connection between the hollow outer part 3 and the first armature can also be simplified. The hollow outer part and the first armature can in practice be much closer together provided that they guarantee sufficient decoupling between the magnetic circuits corresponding to tilting and those corresponding to centering.

By combining the currents flowing in each of the two pairs of tilt windings, a tilt torque can be obtained at will about any axis in the plane transverse to the reference axis Z—Z. The configuration shown with four tilt windings is simple to implement. It is nevertheless clear that three windings are sufficient for tilting about any axis in this transverse plane. Likewise for centering.

The bearing shown in FIG. 1 is therefore capable of controlling tilting of the body A about two tilt axes and also of centering that body with respect to each of the three axes X—X, Y—Y and Z—Z.

Note that the central portion of the magnetic bearing shown in FIG. 1 is closed at the top, i.e. there is only one opening in it, at the bottom, through which passes a member for connecting the inner part to the remainder of the body. It is of course possible to provide two openings, for example symmetrical openings.

Figure 5:
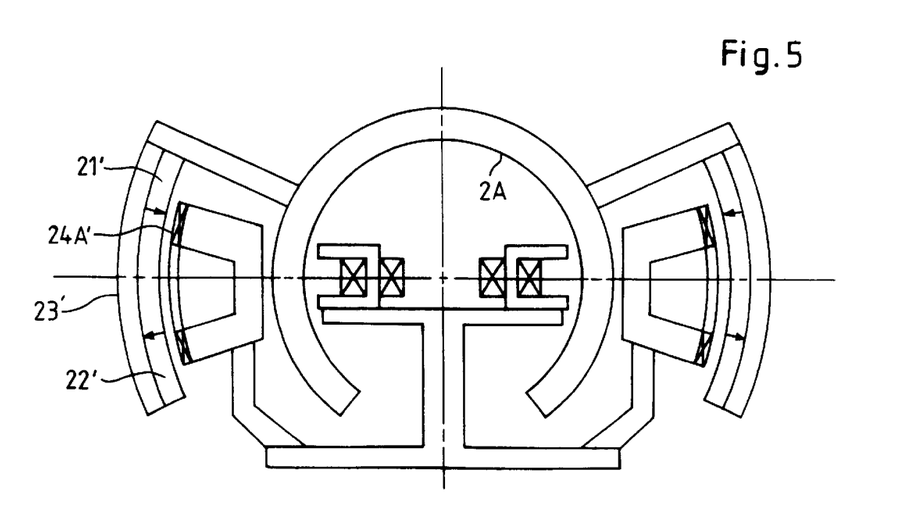
FIG. 5 is a sectional view of a variant of the bearing shown in FIG. 1.

FIG. 5 shows a variant of the bearing shown in FIG. 1 in which the circumferential strands of the windings, for example those of the winding 24A', have smaller angular amplitudes (as seen from the center of tilting) while the permanently magnetized rings 21' and 22' have greater angular amplitudes. Tilt control performance remains the same, within the same range of movement, because the number of circumferential strands in the air-gaps is the same, for any inclination. Unlike the FIG. 1 example, there is a greater magnetized mass, but all the circumferential strands contribute to generating tilting or centering forces.

Figure 6:
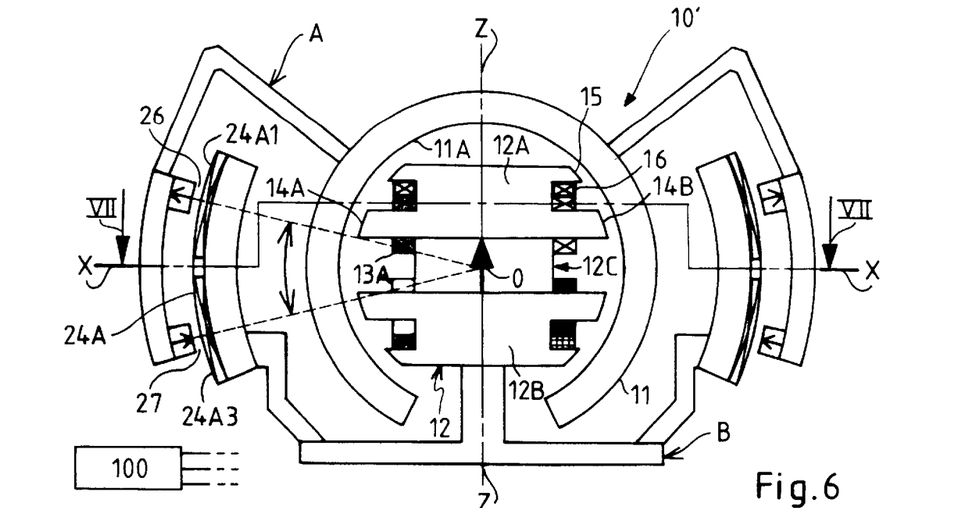
FIG. 6 is an axial view of another embodiment of a bearing according to the invention taken along the line VI—VI in FIG. 7.
Figure 7:
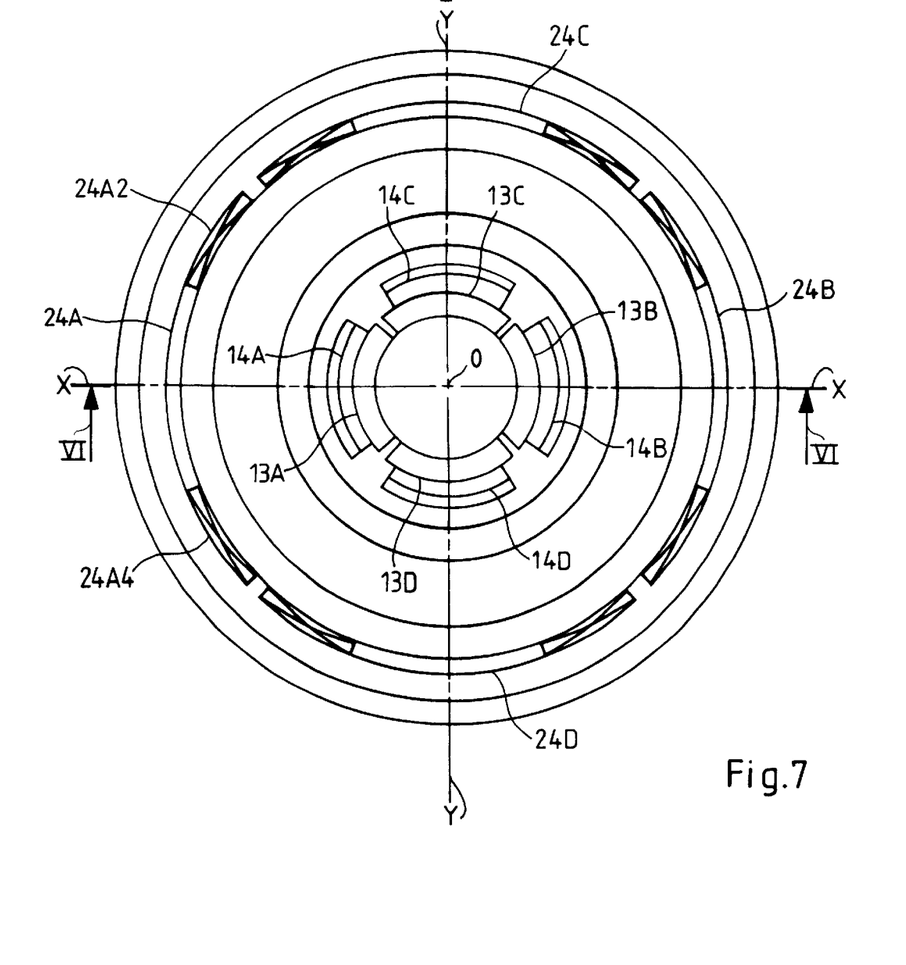
FIG. 7 is a view of the bearing in cross-section taken along the line VII—VII in FIG. 6.

FIGS. 6 and 7 show another bearing 10' according to the invention which differs from that shown in the previous figures in terms of the structure of the centering members.

The magnetic bearing has a hollow outer part 11 attached to the first body A and an inner part 12 attached to the second body B.

The hollow outer part 11 has an inside surface 11A whose shape is a portion of a sphere substantially concentric with the center O of tilting. The hollow outer part extends completely around the reference axis Z—Z on both sides of a transverse plane perpendicular to the reference axis and passing through the center O of tilting. In FIG. 6, the transverse plane is defined by an axis X—X transverse to the reference axis Z—Z at the point O.

The hollow outer part 11 is at least partly made from a ferromagnetic material of any appropriate type known in the art.

The inside part 12 comprises two separate members 12A and 12B on respective opposite sides of the transverse plane defined above and separated in the direction parallel to the reference axis by a space 12C which has a high reluctance.

Each member comprises a plurality of (at least three) ferromagnetic areas offset angularly around the reference axis and each area defines two air-gaps in conjunction with the inside surface 11A of the hollow outer part 11 and has at least one specific winding 13A, 13B, 13C or 13D adapted to generate magnetic flux lines closing across the two air-gaps.

In the embodiment shown in FIG. 6, and as can be seen in FIG. 7, the plurality of ferromagnetic areas is preferably formed of two pairs of diametrally opposed ferromagnetic areas offset angularly 90° about the reference axis.

To be more precise, there is one pair of ferromagnetic areas aligned with the centering axis X—X and one pair of ferromagnetic areas for centering with respect to the third axis Y—Y.

Each ferromagnetic area of each member has first and second projections directed towards the inside surface of the hollow outer part to form the air-gaps of this ferromagnetic area, one of these projections, referred to as the first projection, having said specific winding wound around it. To be more precise, as shown in FIGS. 6 and 7, the upper member 12A (and what follows is also valid for the lower member 12B) has an annular series of four projections 14A, 14B, 14C and 14D whose edges are substantially centered at the center O of tilting and define one of the two air-gaps of each ferromagnetic area.

The member 12A further includes, at a distance from this annular series of four projections, a continuous annular projection 15 whose edge is also substantially centered at the center of tilting; this annular projection defines the second air-gap of each of the ferromagnetic areas.

The edges of the various projections are preferably substantially portions of a common sphere so that all the air-gaps have the same thickness.

The various ferromagnetic areas of each member can be separate. However, for simplicity, the various ferromagnetic areas are parts of a common ferromagnetic member (here the member 12A as a whole).

As seen in FIG. 7, the windings 13A to 13D wound around the first projections 14A to 14D are substantially adjacent in the circumferential direction.

The group of windings of each member 12A or 12B advantageously further includes an additional winding 16 (16' for the lower member) wound around the member 12A between the first and second projections in the ferromagnetic areas. The additional winding 16 is preferably adjacent the specific windings 13A to 13D with the result that all of the space between the projections is occupied either by one of the specific windings or by the additional winding.

FIG. 6 shows that the specific windings and the additional winding extend along a cylindrical portion of the member 12A which has the same diameter. Of course, as an alternative to this (not shown), the additional winding can extend around a portion whose diameter can be different from that of another cylindrical portion along which the specific windings extend. As an alternative to this, the specific windings can be disposed in a configuration closer to a polygon.

Each specific or additional winding of the top or bottom member is connected to the excitation circuit 100 which is adapted to apply an appropriate excitation current to each winding.

In the example shown in FIG. 6, the space 12C between the two members 12A and 12B is occupied by a permanent magnet which is magnetized in the axially upwards direction. This magnet has a reluctance adapted to prevent flux lines generated by the group of windings of either member crossing this space.

In the embodiment shown in FIGS. 14 to 17, the space 12C can be free of magnets, essentially consisting of an air-gap having the required reluctance. The members 12A and 12B can of course be totally independent of each other if they are respectively fixed from below and from above. The foregoing description (regarding the existence of an air-gap of very high reluctance) nevertheless remains valid if there is a connection fastening together the members 12A and 12B, provided that this connection has sufficient reluctance to prevent significant circulation of flux lines generated by the windings.

FIGS. 8 to 13 show either magnetic flux lines or resulting forces in the air-gaps for various winding excitation configurations. To make the figures easier to read, windings of which only the edge can be seen are represented differently for each winding (and likewise in the previous figures, to facilitate distinguishing between the various windings).

Figure 8:
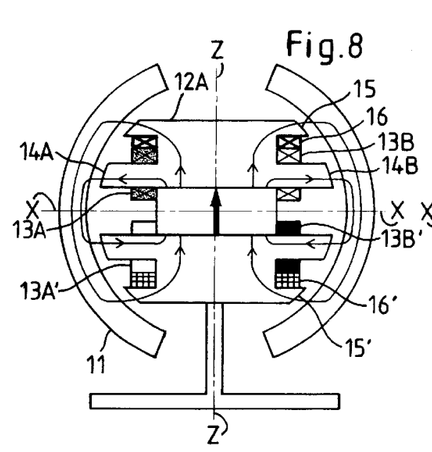
FIG. 8 is a partial view of the bearing shown in FIG. 6, showing the flux lines generated by the central magnet on the centering members.

For example, in FIG. 8, the additional winding 16 of the upper member 12A is readily identified, together with the two diametrally opposed specific windings 13A (on the left) and 13B (on the right).

It will be remembered that, by convention, a circle containing a dot near the edge of a winding indicates that a current is flowing in the direction out of the plane of the drawing and that a circle containing a cross corresponds to the opposite current direction. What has just been stated is valid for the lower member 12B (since, in this example, it has the same geometry as and is disposed symmetrically to the upper member about the transverse plane passing through the center O) and the windings of the lower member are identified by the same reference numbers as the windings of the upper member but "primed".

FIG. 8 includes a simplified representation of the magnetic flux lines generated by the permanent magnet occupying the space 12C between the members 12A and 12B.

Note, on the right and on the left in FIG. 8, small magnetic loops crossing the air-gaps nearest the transverse plane, near the projections 14A and 14B in the case of the upper member, and larger magnetic loops crossing the air-gaps at the ends, formed between the hollow outer part and the annular projections 15 (and 15' in accordance with the aforementioned notation used for the lower member) at the ends.

The passage of magnetic flux lines across an air-gap produces a force transverse to the air-gap whose amplitude increases in direct proportion to the number of magnetic flux lines crossing the air-gap.

Figure 9:
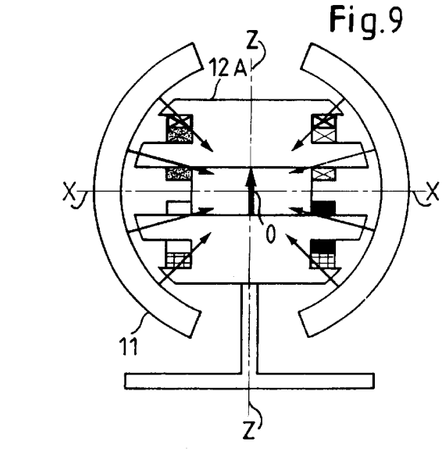
FIG. 9 is a view analogous to that of FIG. 8, with arrows whose amplitude and direction correspond to the forces generated by the magnetic fluxes crossing the air-gaps.

Because the magnet is disposed symmetrically with respect to the reference axis, which implies that the magnetic flux lines generated by the magnet are uniformly distributed all around the reference axis, it is clear that, when the hollow outer part is correctly centered relative to the center O of tilting, the passage of the magnetic flux lines across the various air-gaps generates forces in those air-gaps on the hollow outer part which are symmetrical, on the one hand about the reference axis and on the other hand about the horizontal transverse plane. This is shown in FIG. 9 by a set of arrows all converging towards the center O of tilting and which have module which are diagrammatically represented as being the same. For the hollow outer part, the resultant force is of zero amplitude: the hollow outer part does not move.

Figure 10:
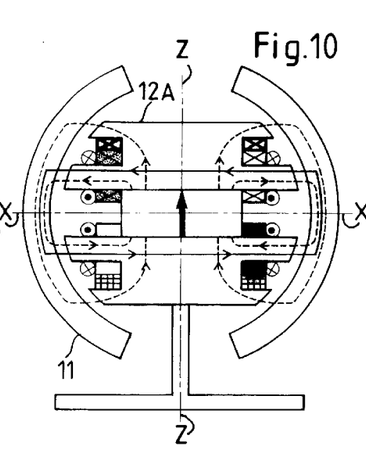
FIG. 10 is a view analogous to that of FIG. 8 but also showing flux lines generated by applying excitation currents to certain windings for centering in the transverse direction.

FIG. 10 shows the flux lines crossing the air-gaps when two specific windings of each of the members which are symmetrically disposed with respect to the transverse plane, i.e. the windings 13A, 13B and 13A', 13B' in FIG. 8, are energized by the excitation circuit 100 shown in FIG. 1 to generate flux lines in the upper member crossing the air-gaps in a common direction (here towards the left) and flux lines in the lower member crossing the corresponding two air-gaps in the opposite direction (towards the right in the FIG. 10 example). Because, as already mentioned, the lower and upper members are solid ferromagnetic material components, the flux lines generated by the aforementioned windings can combine, as shown in FIG. 10, to form a single magnetic loop passing through the upper member towards the left, descending in the hollow outer part, passing through the lower member towards the right and rising in the hollow outer part.

Figure 11:
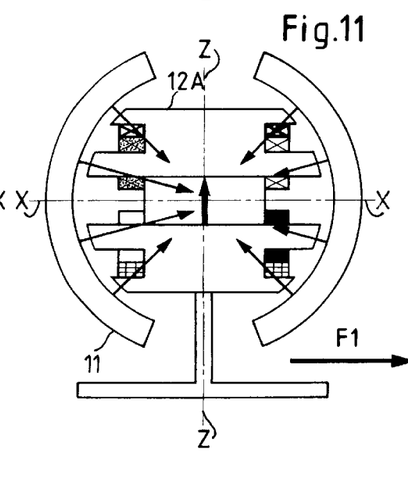
FIG. 11 is a view analogous to that of FIG. 9 with arrows whose amplitude is modified compared to those of FIG. 9 because of the flux lines generated by excitation currents in the windings shown in FIG. 10.

The symmetry of the magnetic fluxes crossing the air-gaps at the ends between the hollow outer part and the annular projections is preserved. On the other hand, in the case of the air-gaps nearest the transverse plane of symmetry, the magnetic loop generated by applying excitation currents to the aforementioned windings clearly increases the flux crossing the air-gaps on the left and reduces the magnetic flux crossing each of the air-gaps on the right. As shown in FIG. 11, this increases the forces generated at the left-hand air-gaps and reduces the forces generated at the right-hand air-gaps. The resultant force F1 (FIG. 11) is substantially parallel to the transverse plane. FIGS. 10 and 11 therefore correspond to a mode of excitation of the windings adapted to center the hollow outer part transversely to the reference axis and with respect to the axis X—X. Clearly, by applying excitation currents to the other pairs of windings, namely those on the axis Y—Y, a transverse centering force with respect to the axis Y—Y can be obtained in a similar manner. It is of course possible to combine excitation currents in each of the pairs of windings, as required, to have at all times an appropriate centering force in the transverse plane perpendicular to the reference axis Z—Z.

Figure 12:
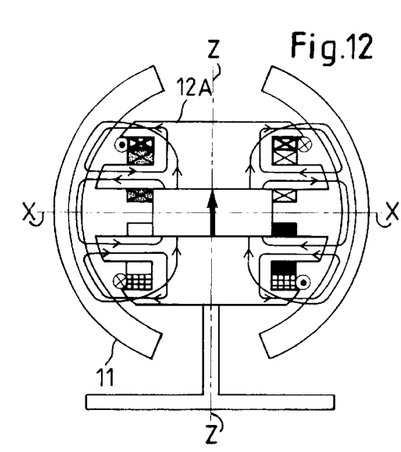
FIG. 12 is another view similar to that of FIG. 8, showing other flux lines generated by currents in other windings, for centering in the axial direction.

FIG. 12 corresponds to another example of excitation of the windings in which the two additional windings (16 and 16' in FIG. 6) are energized to generate magnetic flux lines which are directed outwards in the case of the air-gaps defined by the annular projections at the ends and inwards in the case of the projections nearest the transverse plane.

Figure 13:
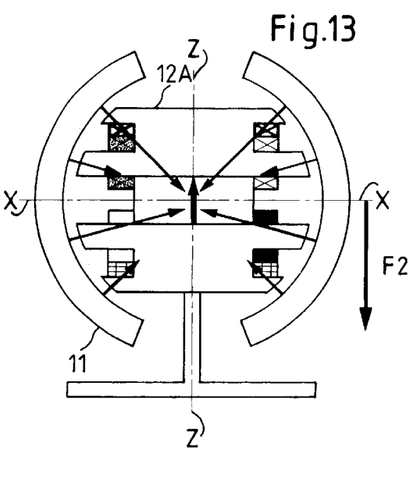
FIG. 13 is a view similar to that of FIG. 9 with arrows whose amplitude allows for flux lines generated by the windings shown in FIG. 12.

Clearly there is an overall increase in the magnetic flux across the air-gaps defined by the upper annular projection at the end and a reduction in the flux in the air-gaps defined by the lower annular projection; similarly, there is a reduction in the flux lines in the air-gaps near the transverse plane in the upper member and an increase in the flux lines crossing the air-gaps of the lower member near the same transverse plane. Because the air-gaps in which the maximum magnetic flux lines travel in the upper member are more inclined to the reference axis than the air-gaps of the lower member which are crossed by a maximum of magnetic flux lines, a downward resultant force is produced, parallel to the reference axis (arrow F2 in. FIG. 13). FIGS. 12 and 13 therefore correspond to a mode of excitation of the windings corresponding to centering of the hollow outer part in the direction parallel to the reference axis.

Clearly, by reversing the direction of the excitation currents flowing in the additional windings, it is possible to obtain a centering force in the direction opposite that designated by the arrow F2 in FIG. 10.

Note that, with regard to centering in the direction of the transverse plane, only the specific windings are electrically energized, and not the additional windings.

With regard to centering in the direction parallel to the reference axis, the same remarks apply since flux lines identical to those shown in FIG. 12 can be obtained by exciting the specific windings appropriately, rather than the additional windings. Consequently, it is clear that centering forces with respect to any of the three axes X—X, Y—Y, Z—Z can be obtained independently of the presence of the additional windings 16 and 16'. It is nevertheless clear that the presence of the additional windings 16 and 16' makes centering with respect to the axis Z—Z very easy. It is nevertheless possible, in accordance with the invention, to provide only the specific windings, for centering with respect to the three axes, with no additional windings at all.

The foregoing description was easy given the symmetry of the two members and the disposition of the windings, and given that each of the members includes two pairs of windings disposed on respective opposite sides of the reference axis and angularly offset by 90°.

It is nevertheless clear that, at the cost of a slight complication in how the excitation currents of the various windings are controlled, it is possible to obtain centering forces transverse to the reference axis and centering forces parallel to the reference axis provided that each of the upper and lower members includes at least three windings, in three ferromagnetic areas, disposed symmetrically or otherwise about the transverse plane in each of the members.

FIGS. 14 to 17 are variants of FIGS. 10 to 13.

From a structural point of view, the magnetic bearing shown in FIGS. 11 to 14 is simpler than that shown in the previous figures because the space between the lower and upper members is essentially empty, forming a wide air gap occupied only by a narrow connector for fastening the upper and lower members together and in theory made of a non-ferromagnetic material.

Furthermore, as emerges below, FIGS. 14 to 17 show that it is possible to apply centering forces with respect to any axis by exciting a smaller number of windings than described with reference to FIGS. 10 to 13.

Figure 14:
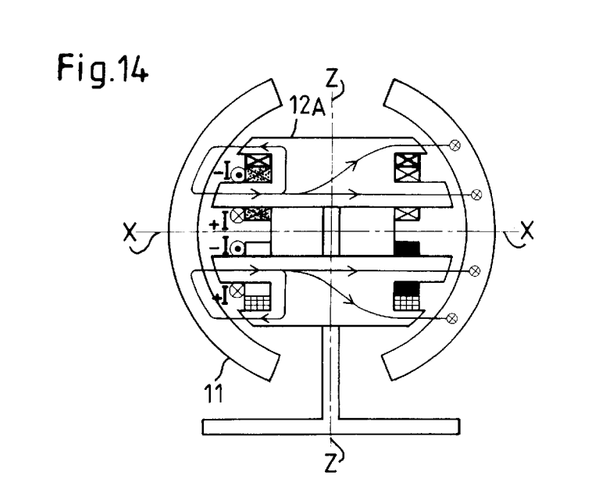
FIGS. 14 and 15 are variants of FIGS. 10 and 11 relating to a variant of the bearing shown in FIGS. 6 and 7.
Figure 15:
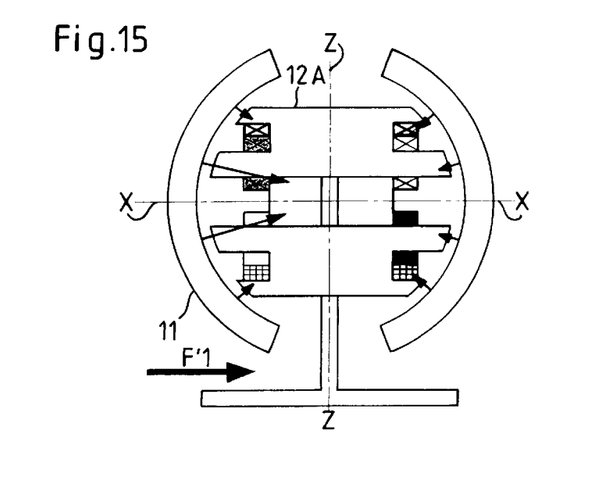

Accordingly, in the FIG. 14 example, only one specific winding of each of the members is activated, namely the specific winding on the left (13A or 13A' in FIG. 6). Here these windings are electrically energized to generate flux lines leaving the specific winding and closed through all the other air-gaps of each part 12A and 12B. As shown in FIG. 15, this generates forces towards the center of tilting in all the air-gaps and of high amplitude in the air-gap associated with the excited winding and of low amplitude in all the other air-gaps. Because of the symmetrical configuration of the air-gaps on either side of the transverse plane, this generates a resultant force F'1 parallel to the transverse plane, directed towards the right. It therefore suffices to activate two well-chosen specific windings to center the hollow outer part with respect to an axis transverse to the reference axis Z—Z.

Figure 16:
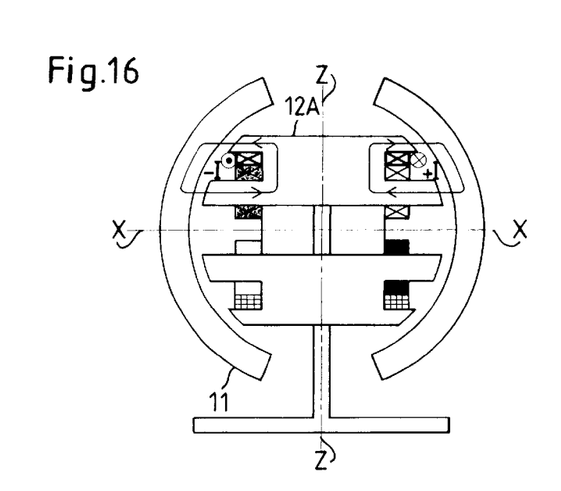
FIGS. 16 and 17 are variants of FIGS. 12 and 13.
Figure 17:
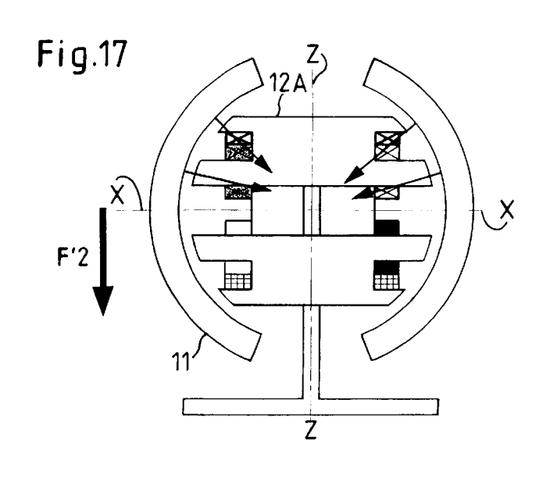

In FIG. 16, only one winding, namely the additional winding 16 of the upper member, is electrically activated, which produces flux lines only in the air-gaps of the upper member. As can be seen in FIG. 17, this generates forces in the air-gaps of the upper member directed towards the center of tilting. This produces a vertical downward resultant force in the direction parallel to the reference axis Z—Z.

Once again, as explained with reference to FIGS. 12 and 13, it would be possible to obtain this centering in the direction parallel to the reference axis by activating two or even all the windings of only one of the members, independently of the presence or absence of an additional winding.

As stated above, it is possible to eliminate the additional windings. It is of course easy, if required, to generate high centering forces in the direction parallel to the reference axis by simultaneously activating some of the specific windings and the additional winding of one or both ferromagnetic members, or even none of them if only the tilt windings are to be used.

FIGS. 18 to 21 show a different configuration for a magnetic bearing 110 with tilt control members 120 and radial centering members 130.

The tilt control members are identical to those of the first bearing and are identified by reference numbers derived from those used in FIGS. 1 to 5 by adding 100.

Figure 18:
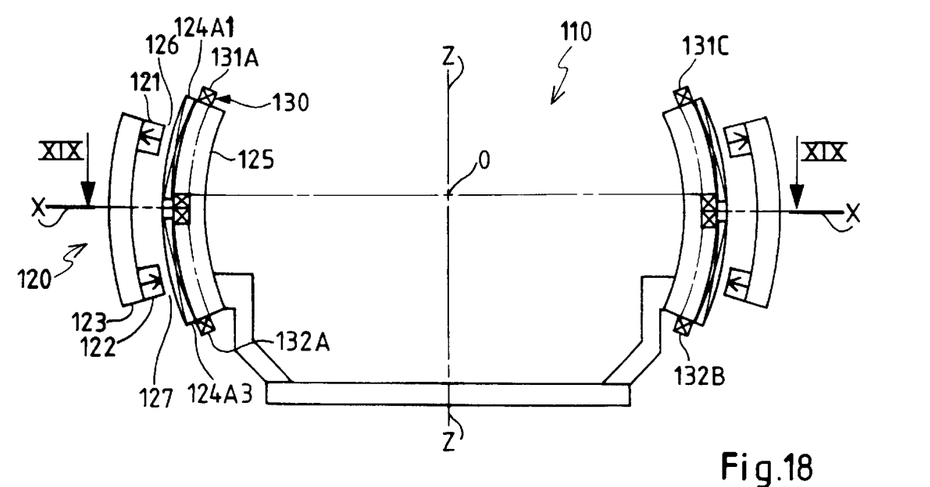
FIG. 18 is a view of another magnetic bearing according to the invention in axial section taken along the line XVIII—XVIII in FIG. 19 in a plane containing a reference axis Z—Z.

In this example, the rings have an angular amplitude less than that of each group of circumferential strands of each winding in the plane passing through the reference axis, for example the plane of FIG. 18. The angle at which the free edge of each ring is seen in FIG. 18 is of the order of one-quarter the angle at which the group of circumferential strands 124A1 or 124A3 is seen in FIG. 1.

Figure 21:
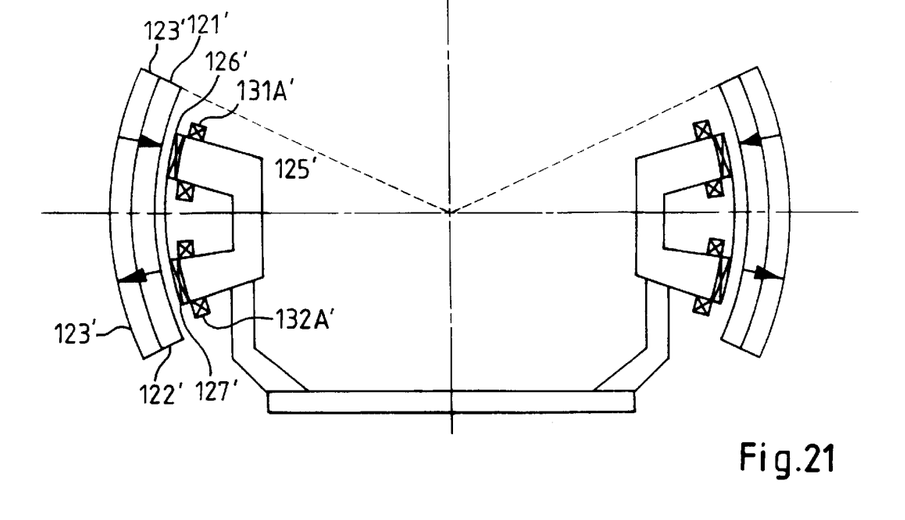
FIG. 21 is a view in axial section of another embodiment of a bearing according to the invention.

In the variant shown in FIG. 21, the magnets have an angular amplitude greater than that of the circumferential strands. There is therefore a substantially constant number of circumferential strands in the air-gap defined between the second armature and the free edge of the magnets, regardless of the angular tilting position of the hollow outer part and therefore of the first armature about the center of tilting.

Figure 19:
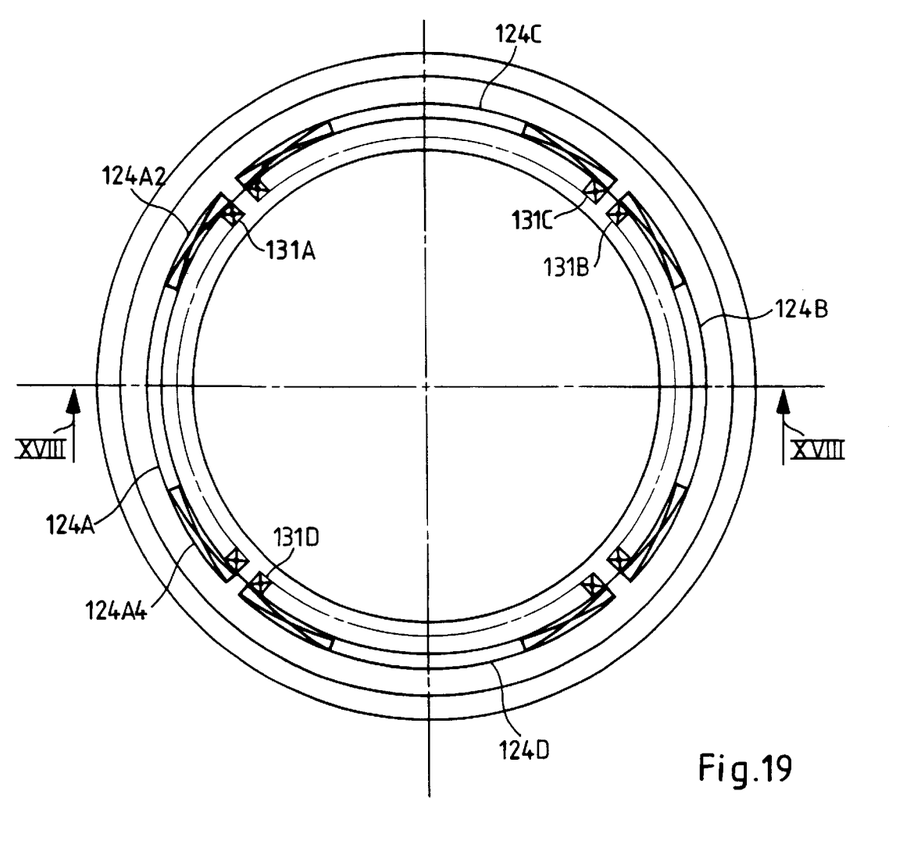
FIG. 19 is a view the bearing in cross-section taken along the line XIX—XIX in FIG. 18.
Figure 20:
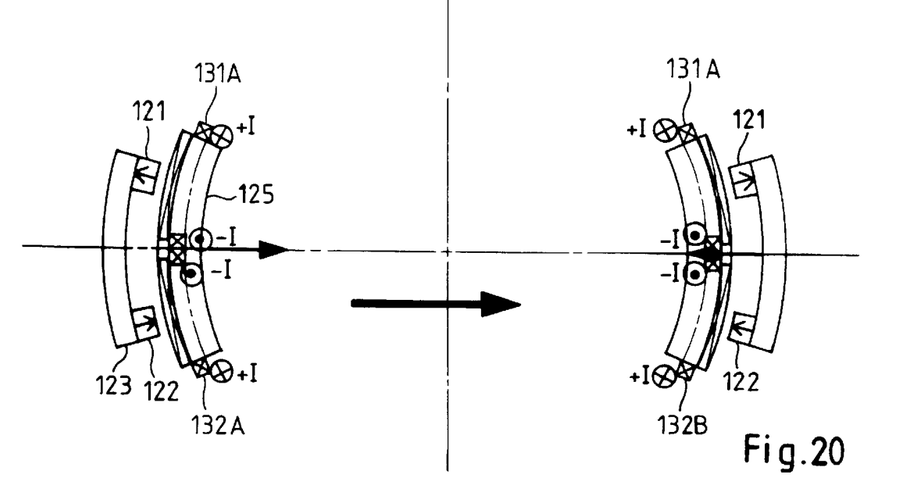
FIG. 20 is another view of the bearing showing a mode of excitation of the windings producing a radial centering force.

The second armature carries two pluralities of circumferential centering windings 131A, 131B, 131C and 131D, and 132A, 132B, 132C and 132D. These pluralities are parallel and in practice on respective opposite sides of the transverse plane.

Each centering winding is wound around a portion of the second armature whose dimensions in the direction parallel to the reference axis are such that it remains radially facing one of the rings when the moving body moves within its given range of movement in tilting.

Thus the second armature has two pluralities of ferromagnetic portions which remain at all times facing the rings.

There are preferably the same number of centering windings and tilt windings (four in this example).

The circumferential strands extend along the ferromagnetic-portions around which the centering windings are wound. The various windings have the same angular amplitude, i.e. the circumferential strands of the tilt windings are substantially the same length as the ferromagnetic portions around which the centering windings are wound.

The tilting or centering windings of each plurality are substantially adjacent in the circumferential direction.

Figure 3:
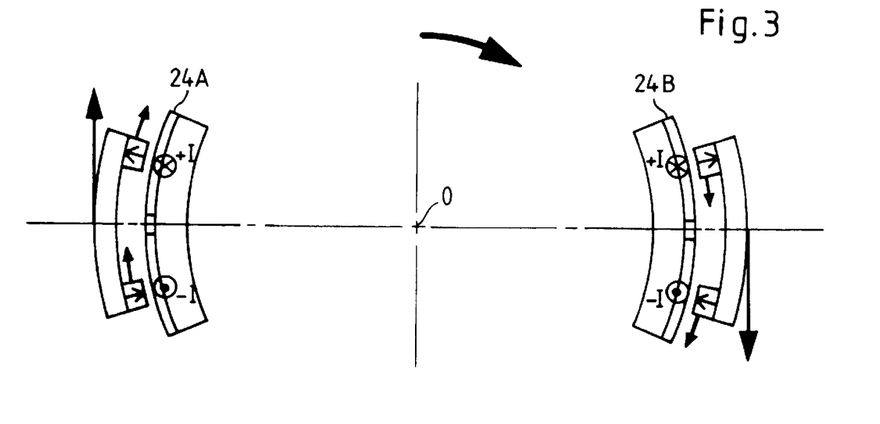
FIG. 3 is a partial view of the bearing in the plane of FIG. 1 showing one mode of excitation of the windings to produce a tilting torque.
Figure 4:
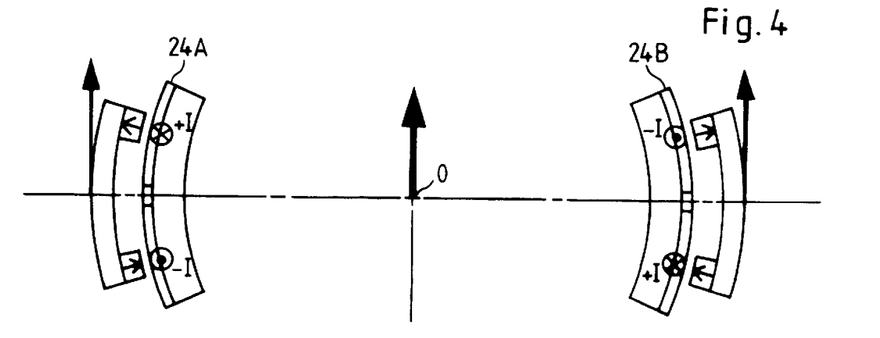
FIG. 4 is another partial view of the bearing in the plane of FIG. 1 showing a regime of excitation of the windings producing an axial centering force.

As mentioned in relation to FIGS. 3 and 4, if a current is passed through one of the windings, for example the winding 124A, the result is a force between the two armatures 123 and 125 which is roughly defined by the vector product of the magnetic field in the air-gaps and the global current flowing in the air-gaps. As in FIGS. 3 and 4, tilt torques or axial centering forces can be generated.

Also, if currents flow in opposite directions in the two centering windings which face each other in the axial direction (see FIG. 20), the result will be fluxes across the air-gaps which are either added to or subtracted from the permanent flux generated in the two air-gaps by the two rings. The increase or decrease in the flux in the two air-gaps generates a force in the air-gap directed towards the reference axis which is either greater than or less than the force in the radially opposite air-gaps in which the only flux is that generated by the permanently magnetized rings. There is therefore a centering force, either to the right or to the left. Of course, current can also be passed through the radially opposite centering windings to generate higher centering forces.

The foregoing description applies generally to the situation in which there are only three centering windings, for example, in which case it is necessary to take into consideration the resultant of all the forces generated in the air-gaps all around the reference axis.

In the example shown the second armature 125 is radially inside the first armature 123. Clearly, as an alternative to this, the second armature can be radially outside the first armature 123.

By combining the currents flowing in the two pairs of tilt windings, a tilt torque can be obtained at will about any axis in the plane transverse to the reference axis Z—Z. The configuration shown with four tilt windings is simple to implement. It is nevertheless clear that three windings are sufficient to obtain tilting and centering about any axis in the transverse plane.

Similarly, by appropriately combining the currents in the various centering windings, it is possible to achieve centering in any direction in the transverse plane.

The bearing shown in FIG. 18 is therefore well able to control tilting of the body A about two tilt axes and also centering of the body with respect to each of the three axes X—X, Y—Y and Z—Z.

FIG. 21 shows a variant of the bearing shown in FIG. 18 (parts similar to those in FIGS. 18 and 19 have the same reference number "primed"), in which the circumferential strands of the windings, for example of the winding 124A', have smaller angular amplitudes (as seen from the center of tilting), while the permanently magnetized rings 121' and 122' have larger angular amplitudes. Tilting control performance is the same (even if there is a strong angular reluctance torque, i.e. a return torque), within the same range of movement, since the number of circumferential strands in the air-gaps is the same for any inclination. Unlike the arrangement shown in FIG. 18, there is a greater magnetized mass, but all the circumferential strands contribute to generating tilting or centering forces.

What is claimed is:

1. A magnetic bearing for centering and controlling tilting of a first body, the first body being mobile in tilting within a range of angular movement from minus 5° or lower to plus 5° degrees or greater about a center of tilting, relative to a second body having a reference axis passing through the center of tilting, the bearing including centering members that center the first body magnetically relative to the second body at least in a direction transverse to the reference axis, the bearing further comprising:

two permanently magnetized rings carried by a first ferromagnetic armature fastened to the first body extending around the reference axis, where each of the two permanently magnetized rings has a magnetization direction that passes at all points at least approximately through the reference axis, wherein each of the permanently magnetized rings is parallel to the other and offset in a direction parallel to the reference axis and on respective opposite sides of the center of tilting and has free edges substantially forming portions of a common sphere centered on the center of tilting;

a plurality of annular tilt windings fastened to the second body and each including two groups of circumferential strands that respectively face the permanently magnetized rings regardless of the orientation of the hollow outer part relative to the center of tilting within the range of movement in tilting, wherein the annular windings are carried by a second ferromagnetic armature defining in conjunction with the magnetized rings air-gaps whose thickness remains constant throughout the range of angular movement in tilting; and an excitation circuit that applies excitation currents to the tilt windings to generate tilt forces in the air-gaps.

2. A bearing according to claim 1, wherein the excitation circuit also applies to the tilt windings excitation currents to generate in the air-gaps centering forces in the direction parallel to the reference axis.

3. A bearing according to claim 1, wherein the rings have magnetization directions that at all points pass at least approximately through the center of tilting.

4. A bearing according to claim 1, wherein the two rings have a same diameter and are symmetrical to each other about the center of tilting, and wherein the tilt windings are symmetrical to each other about the transverse plane.

5. A bearing according to claim 1, wherein the two rings have a spacing in a plane containing the reference axis corresponding to an angular offset of at least 10° relative to the center of tilting.

6. A bearing according to claim 1, wherein the circumferential strands of each group of each tilt winding are disposed adjacently on a spherical surface of the second armature centered on the center of tilting.

7. A bearing according to claim 1, wherein the rings have an angular amplitude in a plane passing through the reference axis greater than that of each group of circumferential strands of each tilt winding.

8. A bearing according to claim 1, wherein the rings have an angular amplitude in a plane passing through the reference axis less than that of each group of circumferential strands of each tilt winding.

9. A bearing according to claim 1, wherein the second armature is radially inside the first armature.

10. A bearing according to claim 1, wherein the plurality of tilt windings includes four windings disposed in two pairs of areas that are diametrically opposite relative to the reference axis and offset by 90°.

11. A bearing according to claim 1, wherein the centering members include two parallel pluralities of annular centering windings fastened to the second ferromagnetic armature, each annular centering winding surrounds a respective portion of the second ferromagnetic armature, the respective portions of the second ferromagnetic armature are divided into two parallel pluralities of ferromagnetic portions respectively that face each of the permanently magnetized rings regardless of the orientation of the hollow outer part relative to the center of tilting within the range of angular movement in tilting, and wherein the excitation circuit applies excitation currents to the centering windings to generate forces for centering the first body in a radial direction.

12. A bearing according to claim 11, wherein the circumferential strands of the tilt windings extend along the respective portion of the second ferromagnetic armature around which the centering windings are wound.

13. A bearing according to claim 11, wherein the pluralities of centering windings and the plurality of tilt windings each include the same number of windings.

14. A bearing according to claim 11, wherein the tilt windings and the centering windings have substantially a same angular amplitude about the reference axis and substantially face each other in an axial direction.

15. A bearing according to claim 11, wherein each plurality of centering windings includes four windings divided into two pairs of areas, that are diametrically opposite relative to the reference axis and offset by 90°.

16. A bearing according to claim 1, wherein the centering members include:

a hollow outer part made at least in part from a ferromagnetic material and fastened to the first body, wherein the hollow outer part has an inside surface whose shape is a portion of a sphere whose center is substantially coincident with the center of tilting, and wherein the hollow outer part extends around the reference axis on respective opposite sides of a transverse plane that is perpendicular to the reference axis and passes through the center of tilting; and an inner part fastened to the second body, the inner part including a plurality of ferromagnetic areas that are offset angularly about the reference axis, each of the plurality of ferromagnetic areas defines in conjunction with the inside surface of the hollow outer part two centering air-gaps provided with a specific winding that generate magnetic flux lines closing across the centering two air-gaps, wherein the specific windings form part of a set of windings connected to the excitation circuit that generates magnetic fluxes in the centering air-gaps to center the hollow outer part relative to the inner part at least in the direction transverse to the reference axis.

17. A bearing according to claim 16, wherein the inner part includes two separate members that are disposed on respective opposite sides of the transverse plane and wherein each separate member includes a plurality of ferromagnetic areas offset angularly about the reference axis, each separate member including a group of windings that includes at least the specific windings of the ferromagnetic areas, and wherein the two separate members are separated in the direction parallel to the reference axis by a space having a reluctance that prevents flux lines generated by the group of windings of one of the separate members from crossing the space, and wherein the windings of each group are connected to the excitation circuit.

18. A bearing according to claim 17, wherein said space is occupied by a permanent magnet that is permanently magnetized in the direction parallel to the reference axis.

19. The bearing claimed in claim 17, wherein said space is a free space forming a fixed air-gap.

20. The bearing claimed in claim 17, wherein the ferromagnetic areas of each member are part of a common ferromagnetic part.

21. A bearing according to claim 17, wherein the ferromagnetic areas of the two members are symmetrical about the transverse plane.

22. A bearing according to claim 17, wherein each ferromagnetic area of each member includes first and second projections that are directed towards the inside surface of the hollow outer part to form the respective air-gaps of that area, and wherein the first projection has said respective specific winding wound around it.

23. A bearing according to claim 22, wherein the second projections in the ferromagnetic areas of one member form part of a common annular projection centered on the reference axis.

24. A bearing according to claim 22, wherein the group of windings of each member further includes an additional winding wound around that member between the first and second projections of the ferromagnetic areas of that member, and wherein the additional winding is connected to the excitation circuit, and wherein the excitation circuit applies excitation currents selectively to the additional windings of the members to generate magnetic fields in the air-gaps to apply to the hollow outer part centering forces in the direction parallel to the reference axis.

25. A bearing according to claim 17, wherein the excitation circuit is applies excitation currents selectively to the specific windings of the ferromagnetic areas of the members so as to generate magnetic fields in the air-gaps to apply to the hollow outer part forces in the direction parallel to the reference axis.

26. A bearing according to claim 17, wherein the specific windings of the ferromagnetic areas are adjacent.

27. A bearing according to claim 16, wherein the plurality of ferromagnetic areas includes four ferromagnetic areas divided into two pairs of areas that are diametrically opposed relative to the reference axis and offset by 90°.

28. A bearing according to claim 16, wherein the centering members are radially inside the permanently magnetized rings and the annular plurality of tilt windings.

29. The bearing according to claim 1, wherein the plurality of annular tilt windings fastened to the second body are at least three in number.

30. The bearing according to claim 11, wherein the two parallel annular plurality of centering windings are at least three in number.

31. The bearing according to claim 16, wherein the plurality of ferromagnetic areas are at least three in number.

32. The bearing according to claim 17, wherein the plurality of ferromagnetic areas offset angularly about the reference axis are at least three in number.

* * * * *